US012746775B2

(12) United States Patent
Roch

(10) Patent No.: US 12,746,775 B2
(45) Date of Patent: Sep. 29, 2026

(54) DEVICE FOR PROCESSING DOCUMENTS

(71) Applicant: MB AUTOMATION GmbH & Co. KG, Roding (DE)

(72) Inventor: Julia Roch, Neukirchen/Erzgebirge (DE)

(73) Assignee: MB AUTOMATION GmbH & Co. KG, Roding (DE)

( * ) Notice: Subject to any disclaimer, the term of this patent is extended or adjusted under 35 U.S.C. 154(b) by 79 days.

(21) Appl. No.: 18/199,025

(22) Filed: May 18, 2023

(65) Prior Publication Data

US 2024/0326508 A1 Oct. 3, 2024

(30) Foreign Application Priority Data

May 19, 2022 (DE) ..................... 10 2022 112 628.5
May 19, 2022 (DE) ..................... 10 2022 112 629.3

(51) Int. Cl.
*B42D 25/41* (2014.01)
*B41J 2/44* (2006.01)
*B41M 3/14* (2006.01)

(52) U.S. Cl.
CPC .............. *B42D 25/41* (2014.10); *B41J 2/442* (2013.01); *B41M 3/148* (2013.01)

(58) Field of Classification Search
CPC .......... B42D 25/405; B42D 25/41; B41J 2/44; B41J 2/442; B41M 3/14; B41M 3/148
See application file for complete search history.

(56) References Cited

U.S. PATENT DOCUMENTS

2009/0321400 A1* 12/2009 Wanjek ................ B42D 25/324 219/121.68
2011/0128345 A1* 6/2011 Hoerl ..................... B42D 25/41 347/260
2017/0106672 A1 4/2017 Klages et al.
(Continued)

FOREIGN PATENT DOCUMENTS

DE 102005054396 A1 6/2006
DE 102006031024 A1 1/2008
(Continued)

*Primary Examiner* — Douglas X Rodriguez
*Assistant Examiner* — Kendrick X Liu
(74) *Attorney, Agent, or Firm* — Dykema Gossett PLLC

(57) ABSTRACT

The present invention relates to a device for processing documents (document processing system), in particular security documents. The document processing system according to the invention, in particular for processing security documents, comprises at least one document carrier device with a document receptacle configured to receive a document to be processed and to transport it along a first spatial direction, and at least one document processing device configured to process the document in a processing area so that a visible element is created on the document. In this regard, the document processing device comprises a radiation source and at least one first mirror arrangement and at least one second mirror arrangement, wherein the mirror arrangements are each configured to direct radiation emitted from the radiation source onto the document at a specific angle and/or from a specific direction to produce a visible element. The mirror arrangements are further configured to be moved into the processing area.

12 Claims, 8 Drawing Sheets

(56) References Cited

U.S. PATENT DOCUMENTS

| | | | | |
|---|---|---|---|---|
| 2022/0153012 | A1* | 5/2022 | Schreiter | B41J 11/0024 |
| 2024/0217259 | A1* | 7/2024 | Roch | B41M 3/148 |

FOREIGN PATENT DOCUMENTS

| | | | |
|---|---|---|---|
| DE | 202008007564 | U1 | 8/2008 |
| DE | 102006052380 | B4 | 4/2013 |
| DE | 202021001324 | U1 | 5/2021 |
| EP | 0216947 | A1 | 4/1987 |
| EP | 0219012 | A2 | 4/1987 |
| EP | 2050574 | A1 | 4/2009 |
| EP | 3424731 | A1 | 1/2019 |
| FR | 2898528 | A1 | 9/2007 |

* cited by examiner

Fig. 2a
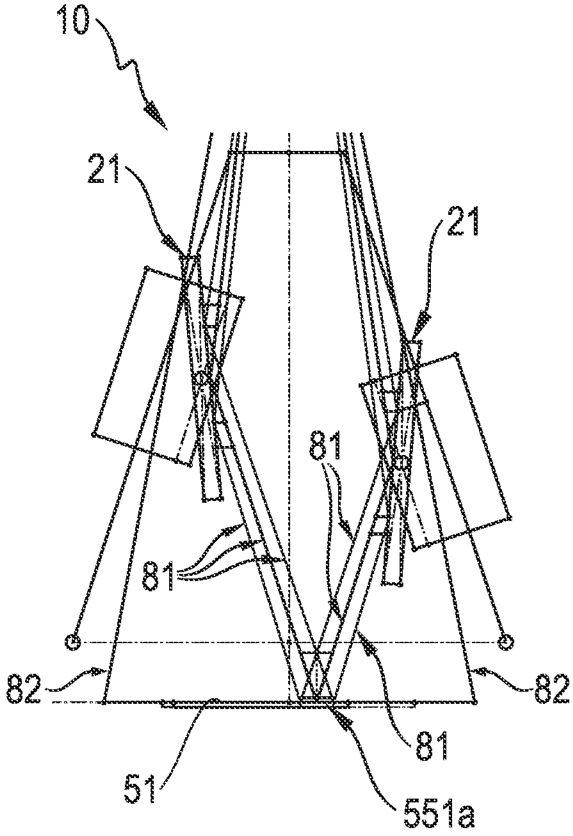
Fig. 3a
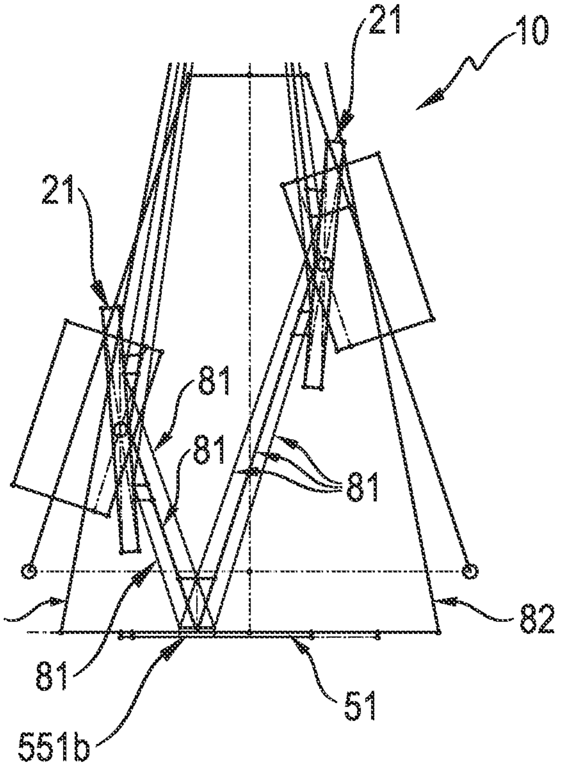
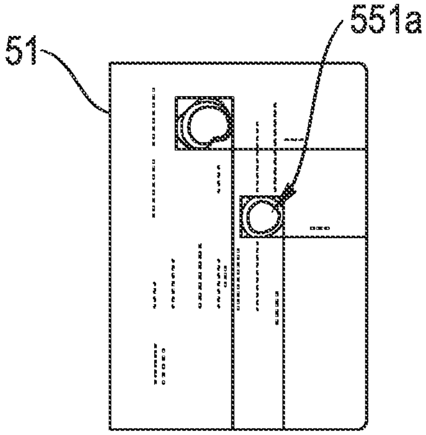
Fig. 2b
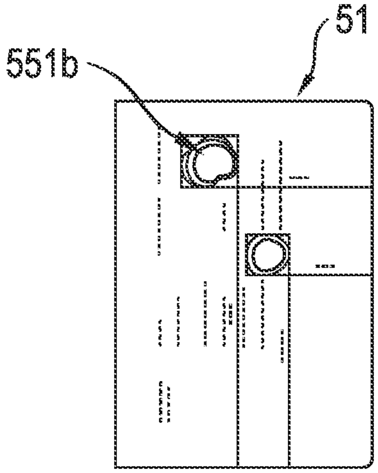
Fig. 3b

DEVICE FOR PROCESSING DOCUMENTS

CROSS-REFERENCE TO RELATED APPLICATION

This application claims the benefit of priority to Germany application No. 10 2022 112 628.5, filed 19 May 2022. This application claims the benefit of priority to Germany application No. 10 2022 112 629.3, filed 19 May 2022.

BRIEF SUMMARY

The invention relates to a device for processing documents (document processing system), in particular security documents. The document processing system is provided in particular for the personalization of documents. The documents to be processed can in particular be card-like or book-like documents and in particular security documents, such as identification documents or credit cards, bank cards, membership cards and the like.

BACKGROUND

A multiplicity of different types of personalized documents, in particular in card form or book form, are known from the prior art. For example, book-like passport documents or individual pages thereof (e.g., the so-called "passport holder page" or paper pages), identification cards and many types of personalized chip cards, such as bank cards, credit cards, identification cards, membership cards, access authorization cards, etc., or personalized (usually card-shaped) labels each belong to the group of personalized documents.

In this context, "personalization" or "personalized" means that the corresponding document contains or carries document-specific information that is typically associated with a holder of the document. For example, in some cases, the information can identify the holder, for example, by means of the holder's name, passport photograph, identity number or other features printed on, otherwise applied onto or introduced into the document or stored therein, in particular in the form of data. In particular, the personalization can be related to an individual person or even to a specific limited group of persons, for example employees of a company.

The processing of the documents to provide them with document-specific and/or non-document-specific information can be carried out in particular by means of printing, by means of engraving or, in particular in the case of a plastic surface, by means of targeted local discoloration of the surface material of the document, in particular in gray shades or gradations thereof, by the action of energy, in particular by means of a suitable laser.

The unexamined German application DE 10 2006 031 024 A1 describes a document processing system and a method for printing security documents. The document processing system comprises a printing unit for printing a security document located in a printing area and a feed unit for successively feeding the security documents into the printing area. The feed unit has a plurality of movable document carriers (document carrier device) for receiving a security document to be printed and moving it into and out of the printing area. The device also has a drive unit for moving the document carriers along a feed direction on various planes arranged perpendicular to the feed direction. Furthermore, it comprises a control unit for controlling the drive device so that the plurality of document carriers are each moved alternately between a receiving position, in which a security document is received, and the printing area. This is done in such a manner that the drive device moves the plurality of carrier devices past each other on the different planes as they move in the feed direction.

In order to increase the counterfeit protection of security documents, security features are incorporated into the document. A widely used security feature is implemented by a so-called "tilt image", also known by the abbreviations "MLI" or "CLI". A tilt image that is visible when the document is tilted about the horizontal axis is referred to as MLI, while a tilt image that is visible when the document is tilted about the vertical axis rotated by 90° is referred to as CLI.

Such a tilt image usually has a lens structure along its lateral extent as an optically effective imaging structure and is implemented with an information structure deposited in the lens structure. Thus, the introduced information only becomes visible when light rays are refracted through the lens structure at the correct angle. Depending on the viewing direction, an image is therefore visible or not visible, or only visible in a strongly attenuated form. Such tilt images are applied, for example, as security features on plastic cards and identification documents. The advantage is due to the relatively simple visual verifiability of the tilt images, which is possible even under simple lighting conditions. Such a tilt image is disclosed, for example, in patent specification EP 0 219 012 A2. In order to increase counterfeit protection, relief lenses can also be provided, as disclosed; for example, in patent specification EP 0 216 947 A1.

To produce such tilt images, lasers are used in a document processing system, which can be directed to the document via mirror arrangements in order to apply the tilt image onto the security document. In the case that multiple tilt images are to be applied onto the document at different positions, or that both an MLI tilt image and a CLI tilt image are to be applied onto the document, the document has first to be removed from the document processing system and the corresponding mirror arrangement must be converted (position, and/or orientation change) in order to be able to proceed with the processing. Often, a test run of the converted arrangement is also necessary to ensure functional capability. The entire process is therefore time-consuming and cost-intensive.

SUMMARY OF THE INVENTION

It is therefore the object of the present invention to provide a document processing system which ensures improved handling when processing documents, in particular when inserting security features in the form of tilt images. Furthermore, it is the object of the present invention to provide a method for processing a document by means of the document processing system according to the invention.

This object is achieved by the subject matters of the independent claims. Advantageous refinements of the invention are disclosed in the sub-claims.

The document processing system according to the invention comprises a document carrier device with a document receptacle. Here, the document carrier device is designed to receive and transport a document to be processed, with the transport taking place along a first spatial direction. Within the context of this application, "receiving a document" is to be understood as meaning that the document can be inserted into the document receptacle and, in particular, fixed by the latter. In this case, the document receptacle can be provided in particular as a recess in a surface with the dimensions of the recess corresponding exactly to the dimensions of the document to be received. Such a recess also fixes the document against horizontal displacement on the document carrier device. Other possibilities of positive fixing or, for example, by negative pressure or by the pressure of a mask placed onto the document from above which presses the document into the document receptacle, are also conceivable.

Furthermore, the document processing system has a document processing device which is configured to process a document in a processing area so that a visible element is created on the document. Within the context of the application, the processing of a document is to be understood as the insertion of a visible element comprising personalized document-related data such as name, date of birth or passport photo and/or visible security features such as, in particular, tilt images. In this case, the data to be applied can itself also be provided as a security feature.

The document processing device further comprises a radiation source, at least one first mirror arrangement, and at least one second mirror arrangement. Here, the mirror arrangements are each configured to direct radiation emitted from the radiation source to the document at a specific angle and from a specific direction to produce the visible element. The mirror arrangements are further designed to be preferably moved along a second spatial direction into and out of the processing area in order to be able to redirect the emitted radiation of the radiation source there. Preferably, both mirror arrangements are firmly connected to each other within the processing device and/or arranged at a defined distance from each other on the processing device.

By moving different mirror arrangements into the processing area, differently preset mirror arrangements can be used for processing without removing the document from the document processing system. Thus, for example, the first mirror arrangement can produce a visible element on the document at one position and the second, differently configured mirror arrangement can produce a visible element at another position. Similarly, a CLI tilt image can be applied onto the document using one mirror arrangement and an MLI tilt image can be applied onto the document using the other arrangement. This simplifies the processing of the document, because during the application of different visible elements, no conversion of the mirror arrangements has to be carried out; rather, only one mirror arrangement has to be moved out of the processing area and the other mirror arrangement has to be moved into the processing area.

According to an advantageous embodiment of the invention, the second mirror arrangement is rotated 90 degrees relative to the first mirror arrangement about a vertical axis. As a result, the direction from which the radiation impinges on the document is also rotated 90 degrees about the vertical axis. Thus, the document processing device can be used to create tilt images in which the tilt effect is also rotated 90 degrees. This is particularly unavoidable when creating MLI and CLI elements since an MLI tilt image is also rotated 90 degrees relative to a CLI tilt image. Thus, if a CLI element is created using the radiation redirected by the first mirror arrangement, an MLI element is created on the document using the radiation redirected by the second mirror arrangement, and vice versa. Preferably, the second mirror arrangement, just as the first mirror arrangement, is designed to be alignable.

In another advantageous embodiment of the document processing system according to the invention having a radiation source, the latter emits laser beams into a quadrangular, in particular rectangular, trapezoidal, diamond-shaped or square processing area. The processing area is defined here by the surface that can be reached by the laser beams of the radiation source. In this case, the document to be processed also has a quadrangular, in particular rectangular, square, parallelogram shape, with the processing area being rotated relative to the document by a defined angle, in particular 45 degrees. Due to the rotation, maximum utilization of the processing area on the document can be achieved, in particular in conjunction with the use of mirror arrangements through which the laser beams are reflected onto the document.

Preferably, the two mirror arrangements are designed to be moved along a second spatial direction into the processing area. In particular, both mirror arrangements are provided on a device which can be moved along the second spatial direction in such a manner that either one or the other mirror arrangement is located in the processing area.

In an advantageous refinement of this embodiment of the invention, the first spatial direction along which the document is transported does not correspond to the second spatial direction in which the mirror arrangements are moved. Thus, the first and second spatial directions are not identical. In a particularly preferred embodiment, the first spatial direction is perpendicular to the second spatial direction. By such an embodiment, the document can be positioned on the document carrier device in the processing area in such a manner that a visible element can be produced by the processing device on any position on the document without removing the document from the document processing system. In doing so, it is also possible to apply multiple visible elements onto multiple positions on the document. The change of the position of the visible element to be produced along the first spatial direction is carried out here by the movement of the document carrier device, while the change of the position of the visible element along the second spatial direction can be carried out by the movement of the mirror arrangements.

In an alternative embodiment of the invention, the first spatial direction along which the document is transported by means of the document carrier device corresponds to the second spatial direction in which the mirror arrangements are moved. The two spatial directions are thus identical. Consequently, both the mirror arrangements and the document carrier device move along the same spatial direction. This leads to a particularly slender design of a document processing system.

In an advantageous embodiment of the invention, the mirror arrangements are designed to be alignable in such a manner that the position of the visible element on the document is shifted. In the context of the application, aligning the mirror arrangement does not mean moving the mirror arrangements, but rather rotating at least one mirror of the arrangement such that the radiation through the mirrors impinges on the document in a different position, or changing the height of the mirror, thus, changing the distance from a mirror of the mirror arrangement to the document in the vertical direction. By means of the alignment, small changes to the image position on the document can be made without having to move another mirror arrangement into the processing system. Alignability of the mirror arrangements is particularly advantageous in embodiments in which the first and second spatial directions are identical, thus, in which the document carrier device and the mirror arrangements can be moved in the same direction. The alignment also allows the position of the visible element on the document to be changed in a direction different from this direction. This can significantly increase flexibility when selecting the position of the visible element on the document.

In another advantageous embodiment of the invention, the processing device further comprises other processing tools. Like the mirror arrangements, these can be moved along a second spatial direction into the processing area. Thus, processing operations of the document within the document processing system which, for example, apply visible elements or security features onto the document using other processing methods, are also conceivable. Other processing methods can include, for example, embossing, engraving or printing.

In an advantageous embodiment of the invention, the document carrier device comprises a heating device designed to dissipate heat to the document received by the document carrier device.

By introducing heat, for example, drying processes can be accelerated, or better controlled, whereby both the processing speed and the processing quality of the document processing device can be improved.

Particular preferred is such an embodiment if the heating device comprises an actuator which is adapted to cause a relative movement between a heated heat conducting element and the document receptacle. By means of the relative movement it is possible to switch between two operating modes, wherein in a first operating mode, the heat conducting element extends through one or more recesses in the document receptacle to transfer heat generated by the heating device to the document at least in sections. In the second operating mode, the heating element has a greater distance from the document compared to the first operating mode so that no or only an insignificant amount of heat is transferred to the document.

In this manner, the heating element can remain permanently heated and can be set to the first operating mode for processing steps in which heating is required, and can switch to the second operating mode for processing steps in which heating is not required. As a result, heating and cooling phases can be skipped and the processing of the documents can be accelerated.

Furthermore, advantageous is an embodiment of the document processing system comprising an adjustment device which is designed to change the position and alignment of the at least one first mirror arrangement and/or the at least one second mirror arrangement in such a manner that the corresponding defined angle at which the radiation emitted by the radiation source impinges on the document is changed without changing the position of impingement of the radiation on the document. By means of the adjusting device, the angle of incidence of the radiation on the document can be adjusted, and thus the document processing system can be adjusted to meet different requirements of the document to be processed, which are based, for example, on the choice of material or customer requirements. In addition, a conversion to different products is simplified by adjusting the mirror arrangements. Furthermore, such an embodiment can prevent the need to adapt the software to generate a tilting image since there is a symmetrical structure of a mirror arrangement consisting of two mirrors facing each other for generating the tilting image.

Particularly preferred is such an embodiment if the adjusting device has receptacles, in particular in the form of openings, which are designed to receive corresponding counter elements arranged on the at least one first mirror arrangement and/or at least one second mirror arrangement (22) for fastening the corresponding mirror, arrangement.

By such an embodiment, a possibility of the adjusting device can be provided which is easy to operate and minimizes the risk of incorrect operation. Moreover, it is technically easy to implement.

The method according to the invention for processing a document by a document processing system includes multiple steps. First, the document carrier device of the document processing system is moved to a receiving position in which a document to be processed is placed on the document receptacle. Subsequently, the document carrier device is moved along a first spatial direction to a processing position within a processing area of the document processing system. Further, moving a first mirror arrangement into the processing area is carried out so that radiation emitted from a radiation source in the processing area is directed to the document via the first mirror arrangement to create a visible element. After the visible element is created on the document, moving a second mirror arrangement into the processing area is carried out so that radiation emitted from the radiation source in the processing area is directed to the document via the second mirror arrangement to create another visible element. After processing, the document carrier device is moved to an output position in which the document is removed from the document receptacle.

The features of advantageous embodiments of the device described with respect to the device according to the invention apply equally to features of advantageous embodiments of the method according to the invention.

BRIEF DESCRIPTION OF THE DRAWINGS

In the following, embodiments and advantageous aspects of the present invention will be explained in more detail with reference to the accompanying figures. In the figures:

FIG. 2*a* shows a schematic illustration of a detail of a prior art document processing system 10 in a first configuration.

FIG. 2*b* shows a schematic illustration of a document 51 having a first visible element 551*a*.

FIG. 3*a* shows a schematic illustration of a detail of a prior art document processing system 10 in a second configuration.

FIG. 3*b* shows a schematic illustration of a document 51 having a second visible element 551*b*.

DETAILED DESCRIPTION

Figure 1:
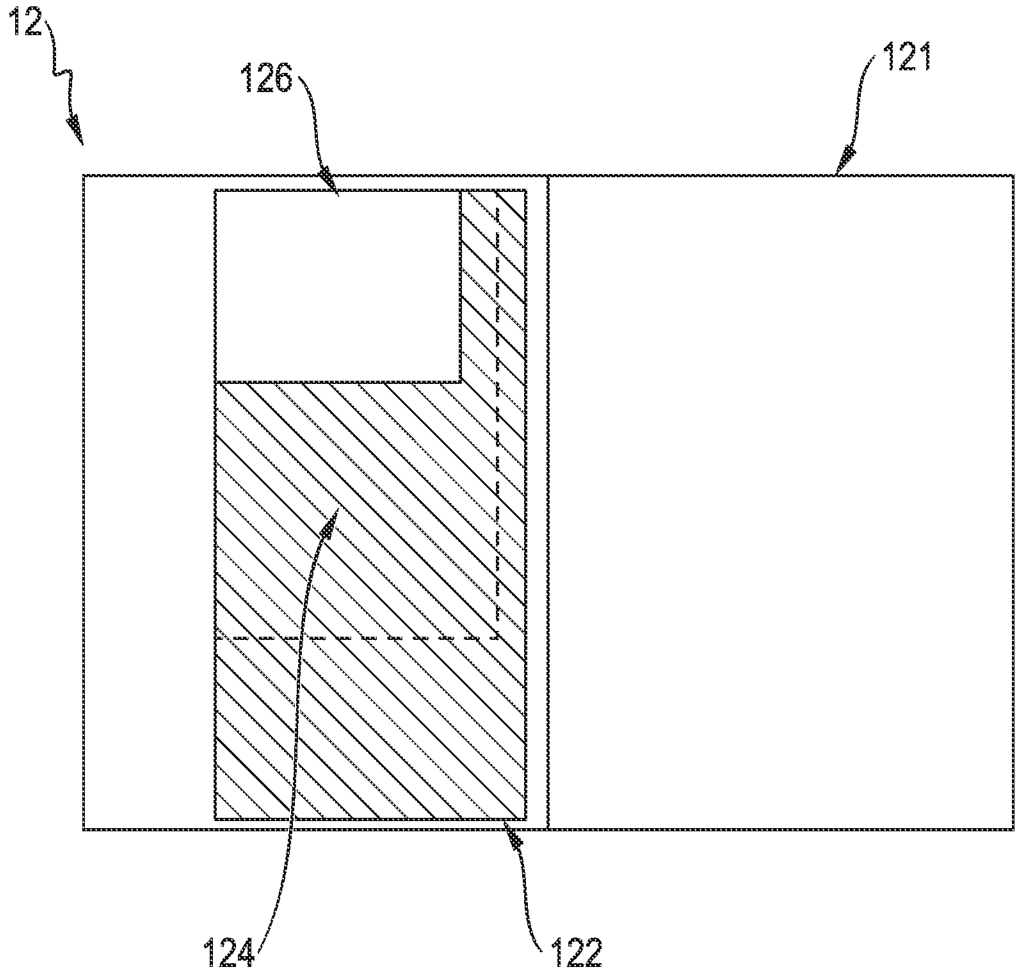
FIG. 1 shows a schematic illustration of a document carrier device 12 from above.

FIG. 1 shows a schematic illustration of a document carrier device 12 of a document processing system 10 (not shown in FIG. 1) from above. It has a document receptacle

121 which is provided in particular in the form of a recess in the document carrier device 12. A document 51 (not shown in FIG. 1) to be processed is to be placed in these defined areas for processing in a document processing system 10 (see FIGS. 4*a* to 5*b*). The document receptacle 121 is to be understood as the entire large rectangle in the figure. In the document receptacle 121 in turn, on the left side in the drawing plane is a processing face 122, which is shown as a shaded area. In this area, the processing in a document processing system 10 inserts a visible element into the document 51 to be processed.

The document receptacle 121 is designed in the present case such that a book-shaped document 51, such as a passport, can be received by it. It can also have a gap in the center into which the spine of a book-like document 51 can be received. A card position 124 is indicated on the left side of the document receptacle 121. This card position 124 can be provided, for example, by a further recess in the document receptacle 121. It has the standardized format of common credit cards, identification cards, membership cards and the like. By means of the corresponding recesses provided, the card or the book-shaped document can be fixed on the document receptacle 121, at least in the lateral direction, and can thus be secured against slipping.

Depending on the document to be processed, it is inserted either into the card position 124 or the document receptacle 121, wherein the processing can be carried out only in the processing face 122.

In an advantageous embodiment, a book-shaped document is placed on the document receptacle 121 and pressed from above onto the document receptacle 121 by a mask (not shown) which has a recess for the processing face 122 of the document, until the mask engages in a specific position, thus fixing the document flat on the document receptacle 121. Both sides of the document receptacle 121 are independently spring-loaded. Depending on the number of pages of the book-shaped document, one side of the document receptacle 121 is possibly more heavily loaded by the application of the mask, but this can be compensated for by the independent mounting of the two sides, so that the surface of the document lies flat at a defined height for processing.

In order to clamp a card-shaped document in the document carrier device, a card adapter is required. The latter has the outer dimensions of the book-shaped document and is also clamped onto the document receptacle 121. The card-shaped document is then inserted into this adapter. Slight errors when inserting the documents are compensated for by software. In the course of this, a camera measures any possible twisting or incorrect position and forwards it to the software. The software compensates for the inaccuracies and forwards the corrected data to the processing system.

Within the processing face 122, a heating element 126 is indicated which is designed to apply heat locally to the document to be processed. This can be beneficial for individual processing steps, for example for drying ink or the like. Therefore, the heating element 126 is preferably provided in the areas where ink is applied during processing. This is usually the case for security-critical documents when displaying a passport photo. Thus, the heating element 126 is preferably located at the place of a passport photo of a document.

FIGS. 2*a* and 3*a* show an embodiment of a prior art document processing system 10 in two different configurations. A first mirror arrangement 21 which directs laser beams 81 from a radiation source (not shown) onto a document 51 to be processed is arranged in a processing area 82. The illustration of the attachment of the mirror arrangement 21 is omitted for the sake of clarity.

In this case, the mirror arrangement 21 is arranged in the first configuration of FIG. 2*a* in such a manner that the laser beams 82 generate a first visible element 551*a* on a specific position of the surface of the document 51. The corresponding document 51 is shown here in FIG. 2*b* in a top view (view from above), where the first visible element 551*a* is indicated at the defined position. Here, the horizontal axis of the document 51 runs in drawing plane from top to bottom, while the vertical axis runs in drawing plane from left to right.

In contrast, the arrangement of the first mirror arrangement 21 in FIG. 3*a* is modified according to the second configuration in such a manner that now the laser beams 82 are directed to a different position on the surface of the document 51 than in the arrangement shown in FIG. 2*a*, as a result of which a second visible element 551*b* becomes visible on the document 51, as FIG. 3*b* shows.

In this regard, changing the arrangement of the mirror arrangement 21 involves some effort in prior art document processing systems 10. For example, the document 51 must first be removed before the arrangement of the mirror arrangement 21 can be changed. Often, an additional calibration or test run must be carried out to verify the new arrangement, often making the processing and creation of two different visible elements 551*a*, 551*b* at two different positions a lengthy process.

Figure 4A:
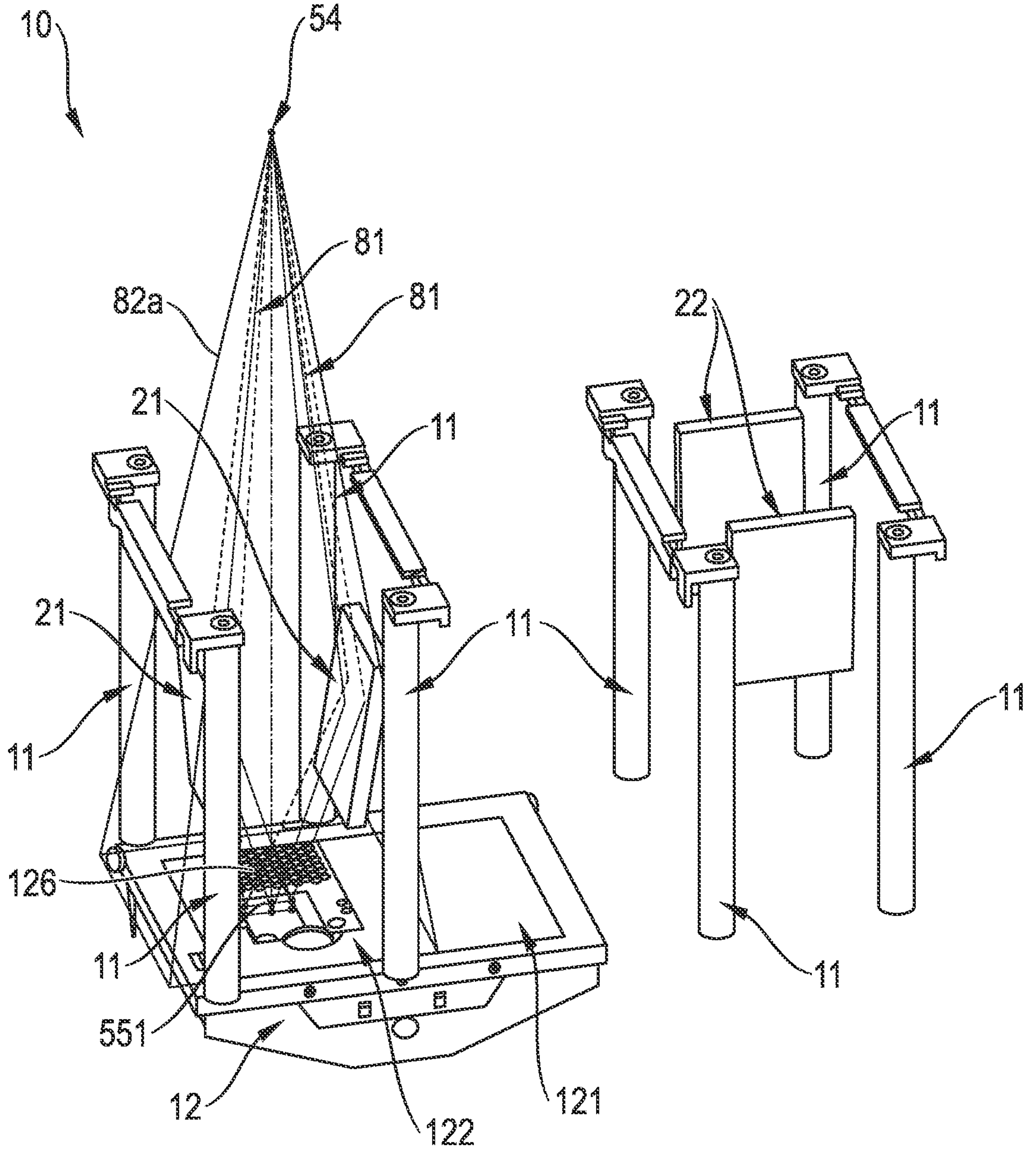
FIG. 4*a* shows a schematic illustration of an embodiment of a document processing system 10 according to the invention in a first configuration.
Figure 4B:
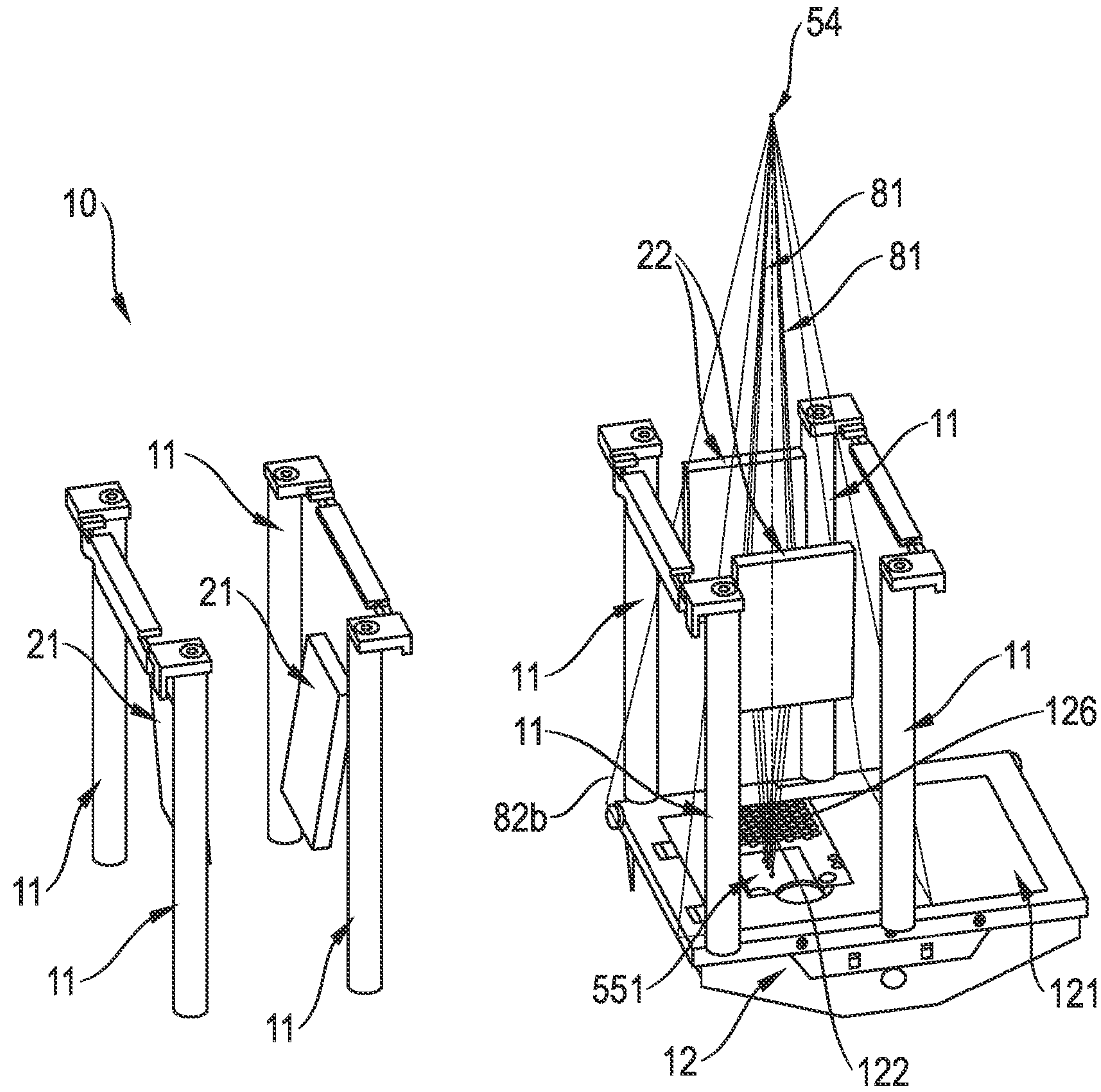
FIG. 4*b* shows a schematic illustration of an embodiment of a document processing system 10 according to the invention in a second configuration.

FIGS. 4*a* and 4*b* show an embodiment of a document processing system 10 according to the invention in different configurations. The embodiment according to FIGS. 4*a* and 4*b* comprises a processing area 82*a*, 82*b*. The document processing system 10 comprises a document processing device 10 with a radiation source 54 in the form of a laser. In the first configuration shown in FIG. 4*a*, the radiation emitted by the radiation source 54 (laser beams 81) is directed by a first mirror arrangement 21 onto the document (not shown) placed on a document receptacle 121 of a document carrier device 12. Through this process, a visible element 551 is applied onto the document.

In the embodiment shown, the document carrier device 12 is movable along a first spatial direction and the first mirror arrangement 21 is movable along a second spatial direction, the two spatial directions being perpendicular to each other. Thus, the position of the visible element 551 on the document is determined in one spatial direction (into the drawing plane) by the position of the document carrier 12 and in the other spatial direction (in the drawing plane from left to right) by the position of the first mirror arrangement 21. Thus, the visible element can be applied onto any position of the document.

The document processing device 11 further comprises a second mirror arrangement 22, which can also be moved into the processing area. According to the drawings, the processing area is designated by reference sign 82*a* if the first mirror arrangement 21 is located in the processing area (FIG. 4*a*) and is designated by reference sign 82*b* if the second mirror arrangement 22 is located in the processing area (FIG. 4*b*). The position of the processing area 82*a*, 82*b* and thus also of the radiation source 54 does not change. Only the mirror arrangements 21, 22 are moved into and out of the processing area 82*a*, 82*b*, respectively. The distance between the two mirror arrangements 21, 22 is fixed.

Here, the two mirror arrangements 21, 22 are arranged rotated by 90 degrees about a vertical axis, whereby the emitted radiation is also directed onto the document rotated by 90 degrees. Thus, in the embodiment of the invention shown, both CLI and MLI elements can be applied onto the document. By different positioning of the mirror arrangements 21, 22 in the processing area 82*a*, 82*b* in one spatial direction and by different positioning of the document by the document carrier device 12 in the other spatial direction, the visible elements can be applied onto the document at different positions. In doing so, the mirror arrangements 21, 22, as shown in FIGS. 4*a*, 4*b*, can also have different distances in vertical direction to the document, thus, different heights.

Advantageously, the mirror arrangements 21, 22 can be aligned, that is, either changed in their height (vertical distance to the document) or, for example, rotated about their vertical or horizontal axes.

The processing device 11, or the mirror arrangements 21, 22 contained therein, can also be moved in such a manner that the radiation emitted by the radiation source 54 is directed directly onto the document. This would correspond to a third configuration, not shown, in which the first mirror arrangement 21 is located on one side and the second mirror arrangement 22 on the other of the processing area 82*a*, 82*b*. Likewise, embodiments are conceivable in which other processing tools such as engraving tools or the like are contained in the processing device 11, which can also be moved into the processing area 82.

In the document receptacle 121 of the document carrier device 12, a heating device 126 is provided, which is indicated in FIG. 4*a* by holes in the surface of the document receptacle 121. In this embodiment, the heating device 126 is provided by a heating element which can be moved in parts out of the holes by an actuator to dissipate heat to a document 51 placed thereon. If no heat supply is required, the heating element is lowered again so that a heat supply is largely prevented.

By means of the embodiment shown, various tilt images can be applied onto the document due to the possibility of moving the mirror arrangements 21, 22 and the document carrier 12 without costly changes to the arrangement, and the position of the tilt images within the processing face 122 can be freely selected.

Figure 5A:
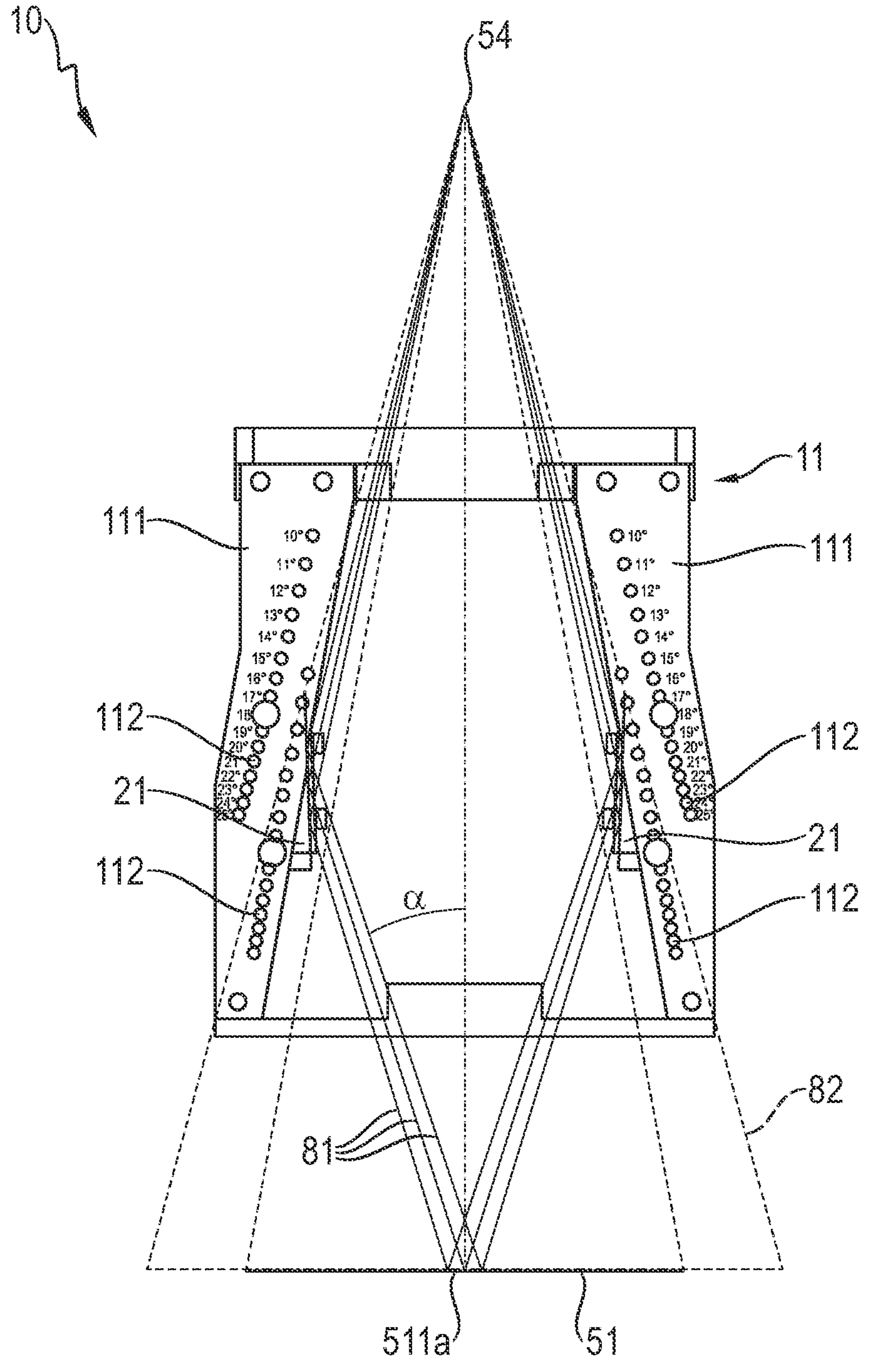
FIG. 5*a* shows a side view of a second embodiment of the invention in a first configuration.
Figure 5B:
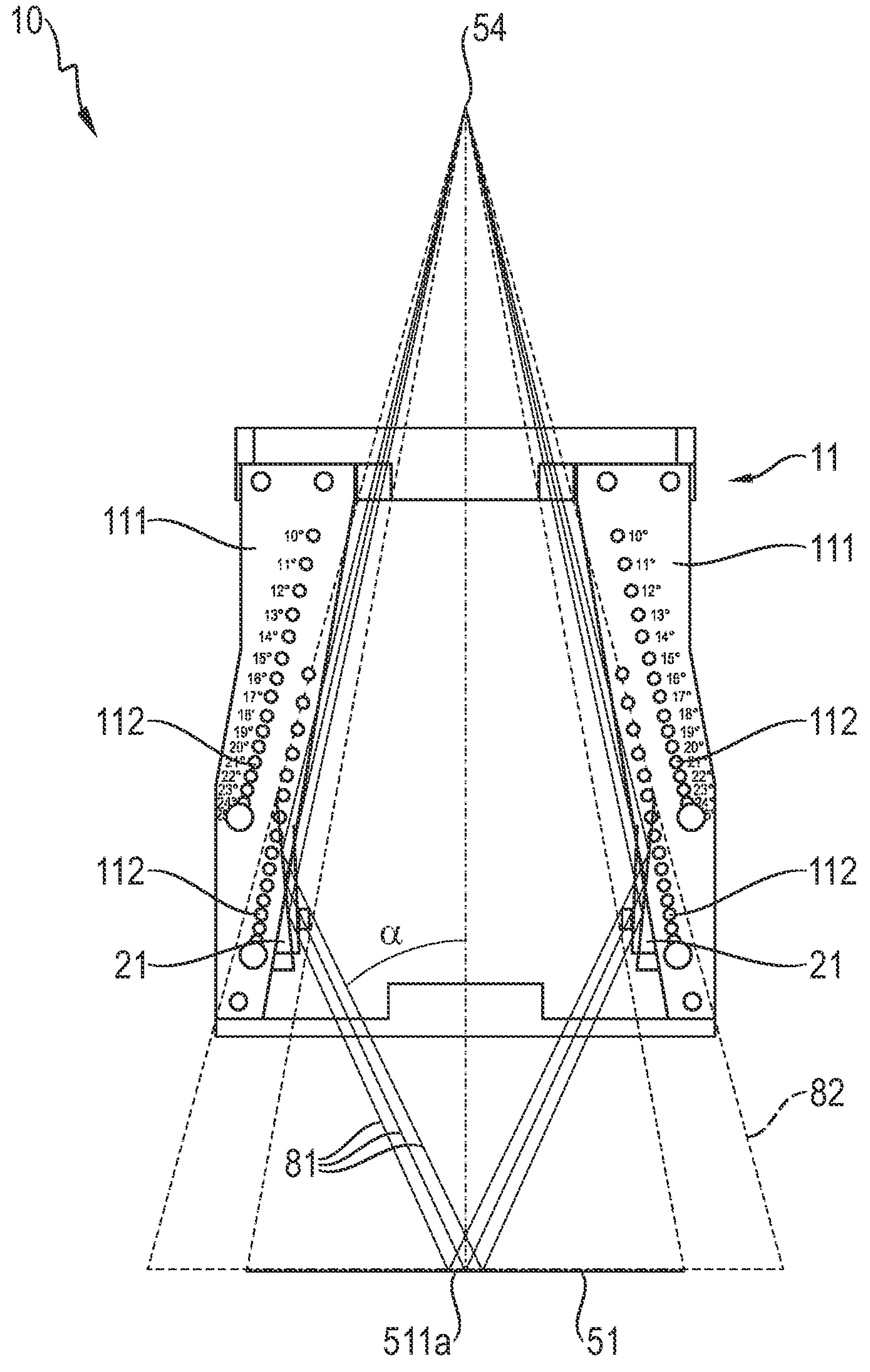
FIG. 5*b* shows a side view of the second embodiment of the invention shown in FIG. 5*a* in a second configuration.

FIGS. 5*a* and 5*b* each show a document processing device 11 of a second embodiment of a document processing system 10 according to the invention in a side view, the figures showing different configurations of the document processing device 11. The configurations differ in that the illustrated first mirror arrangement 21 is positioned differently. It should be noted at this point that the figure could also represent a side view with the second mirror arrangement 22.

Above the document processing device 11, a radiation source 54 is provided which is capable of emitting laser beams within a processing area 82. In this case, the processing area 82 has a rectangular cross-sectional shape, in particular a square cross-sectional shape in the embodiment shown, and is indicated by the dashed lines (see also FIG. 5*d*).

Furthermore, the radiation emitted in the processing area 82 can be directed to a document 51 by a first mirror arrangement 21. The first mirror arrangement 21 consists of two mirrors facing each other which are arranged between two support elements 111 of the document processing device 11. The mirror arrangement 21 is arranged parallel to the longitudinal direction of the quadrangular, in particular parallelogram-shaped document 51. The carrier elements 111 each have openings into which corresponding counter elements arranged on the mirrors engage. The counter elements can be removed from the openings and inserted into other openings provided for this purpose in order to change the position of the corresponding mirror and, at the same time, its orientation. The openings, in conjunction with the counter elements, are thus to be understood as an adjustment device 112.

A radiation 81 emitted by the radiation source 54 in the processing area 82 is directed through the first mirror arrangement 21 onto the document 51. The mirrors of the first mirror arrangement 21 are arranged symmetrically, that is, they are located at the same height (position) above the document 51 and reflect the radiation 81 at the same angle onto the surface of the document 51, This angle is referred to as the first defined angle α and determines at which angle α first visible element 551*a* imprinted in this manner can be seen. The choice of the angle depends in particular on the choice of the material of the document 51 as well as the specific customer requirements.

Comparing the two configurations shown in FIGS. 5*a* and 5*b*, it can be seen that the first mirror arrangement 21 in the first configuration shown in FIG. 5*a* is arranged higher than in the second configuration shown in FIG. 5*b*, and thus the angle α at which the radiation is directed onto the document 51 is different. The height adjustment is carried out by the adjustment device 112. A configuration is thus defined by a defined position of the first mirror arrangement 21. The alignment of the mirrors is also determined by the corresponding definition of the openings, that the angle α in which the radiation impinges on the document 51 is reproducibly linked to a position of the mirrors. Preferably, for ease of understanding, the openings are labeled to facilitate operation and adjustment of the configurations. The change of the angle α at which the radiation impinges on the document 51 can thus be adjusted by the different configurations, with the mirrors of the first mirror arrangement 21 always being adjusted symmetrically. The adjustment device 112 can be implemented in an automated manner or rely on manual execution of the change of configuration.

The visible element 551*a*, 551*b* to be created is always produced at the same position in relation to the document processing device 11. The position of the visible element 551*a*, 551*b* to be created on the document 51 is set in a coordinate direction of the document by the document carrier device 12. In doing so, the visible element 551*a*, 551*b* to be produced is produced centrally below the document processing system 10. In this manner, it can be achieved that no adjustment of the software is necessary when the mirror alignment and position are changed. As a result, a simple changeover of the document processing system 10 to different documents 51 with different requirements and materials can be implemented.

Figure 5C:
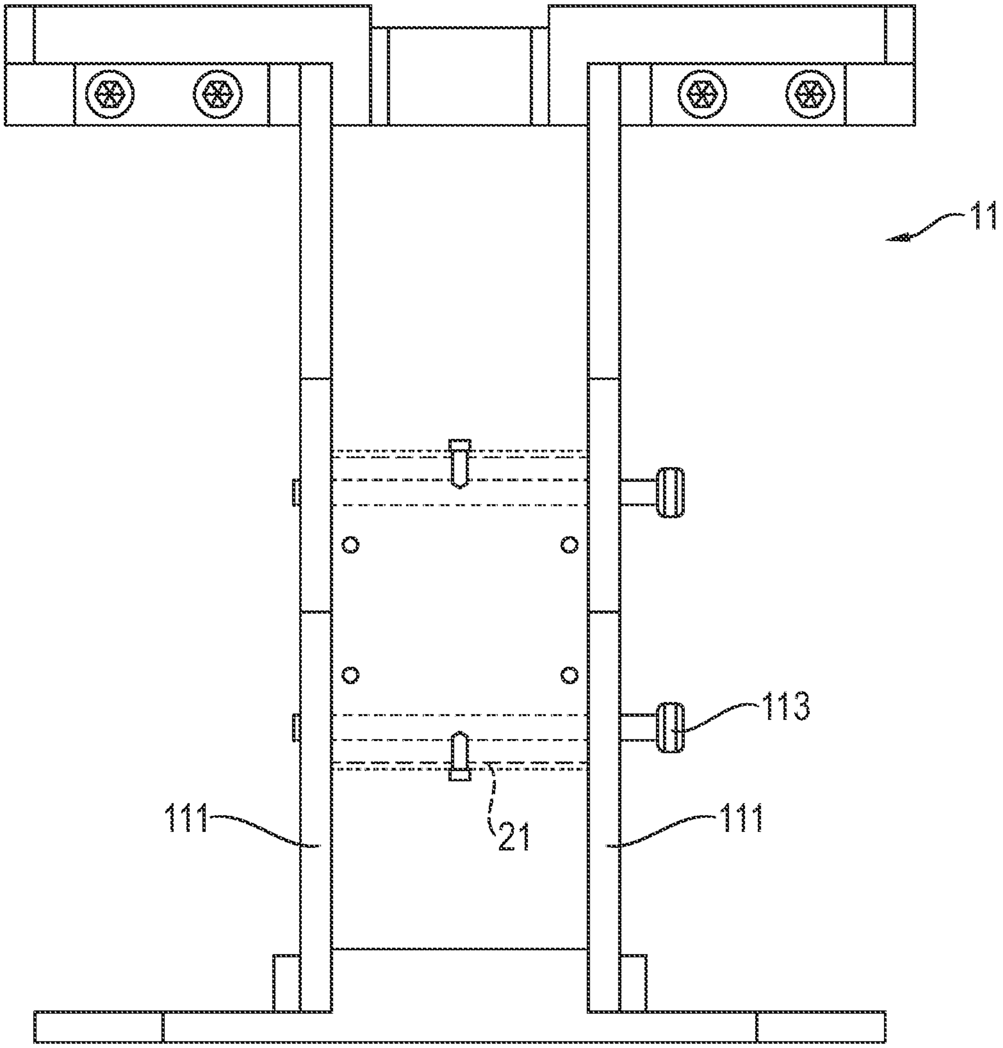
FIG. 5*c* shows an illustration of the second embodiment of the invention shown in FIGS. 5*a* and 5*b* rotated by 90 degrees relative to the illustration in FIG. 5*b*.

With reference to FIG. 5*c*, the adjusting device 112 of the mirror arrangements is described in more detail below. FIG. 5*c* shows the arrangement illustrated in FIGS. 5*a* and 5*b* in a side view rotated by 90 degrees, with each mirror of the first mirror arrangement 21 fastened to two support elements 111. The fastening is carried out by means of the adjusting device 112. For this purpose, counter elements 113 in the form of pins are inserted into openings, in particular fitting holes provided for this purpose on the carrier elements 111, in the drawing plane of the figure from right to left. The correspondingly fastened mirror can thus be mounted with a high degree of accuracy. The counter elements 113 are fixed by means of a clamping by spring pressure pins located in a contact plate arranged on the rear side of the mirror. These pins fix the counter elements 113 in the assembled state. Here, the counter elements 113 extend from one side through the carrier element 111 on the right in the drawing plane through the contact plate of the mirror to the carrier element 111 on the left in the drawing plane. Furthermore, embodiments of the invention are possible in which corresponding counter elements 113 are inserted from both sides. The counter elements 113 can be provided with a thread on counter elements 113 to be provided on both sides as well as on counter elements 113 to be provided on one side to enable a screw connection in one of the carrier elements, or they can be configured as smooth pins.

By means of the described embodiment of the adjusting device 112, the corresponding mirror can thus be positioned at the correct height and also with the correct angle since the orientation can also be influenced by the predetermined openings.

Figure 5D:
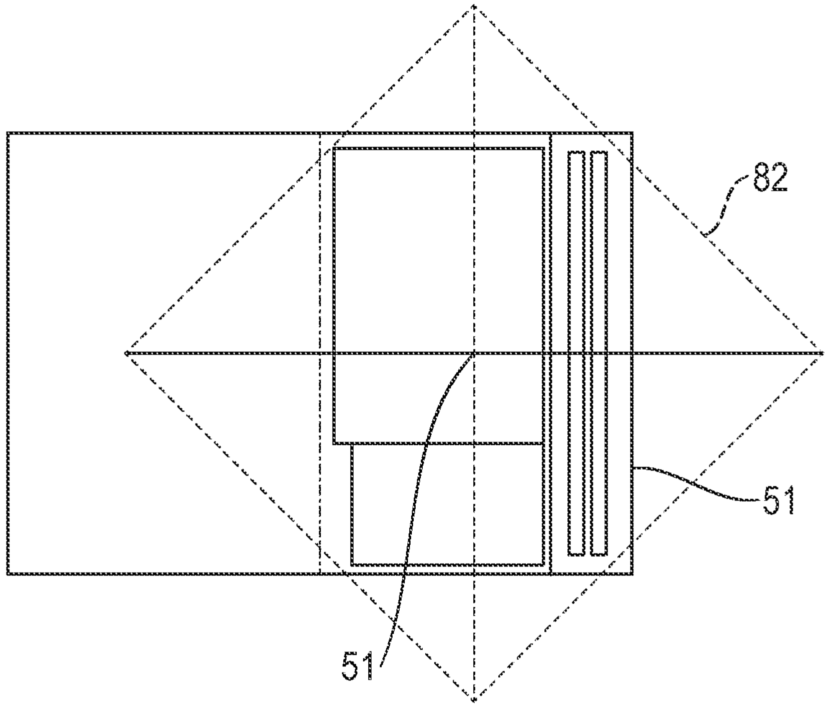
FIG. 5*d* shows the processing area 82 of the second embodiment shown in FIGS. 5*a*, 5*b*, 5*c*.

Furthermore, with reference to FIG. 5*d*, the processing area 82 will be discussed in more detail. FIG. 5*d* shows the processing area 82 of the second embodiment shown in FIGS. 5*a*, 5*b* and 5*c* in a plan view. Here, the processing area 82 is rotated by 45 degrees relative to the document 51. This makes it possible to move the first mirror arrangement 21 further out so that it is still in the processing area 82, but does not block the direct path between the radiation source 54 and the document 51 so as to create the possibility of performing personalizations on the document 51 using the radiation source 54 (without using the first mirror arrangement 21) without converting the first mirror arrangement 21. Accordingly, by rotating the processing area 82, the processing area can be fully utilized. Alternatively, a radiation source 54 with a larger processing area 82 could also be used, although this would create greater hazards due to the radiation that can be generated (in particular laser radiation), which would have to be contained in a correspondingly complex manner.

REFERENCE LIST

10 document processing system
11 document processing device
111 carrier element
112 adjusting device
113 counter element
12 document carrier device
121 document receptacle
122 processing face
123 recess
124 card position
126 heating device
21 first mirror arrangement
22 second mirror arrangement
51 document
54 radiation source
551 visible element
551*a* first visible element
551*b* second visible element
81 laser beams
82 processing area
82*a* first processing area
82*b* second processing area
8 first defined angle

The invention claimed is:

1. A document processing system, in particular for processing security documents, comprising,
   at least one document carrier device with a document receptacle, configured to receive a document to be processed and to transport it along a first spatial direction, wherein the at least one document carrier device comprises a heating device designed to dissipate heat to the document received by the document carrier device,
   at least one document processing device configured to process the document in a processing area so that a visible element is created on the document,
   wherein the document processing device comprises a radiation source and at least one first mirror arrangement and at least one second mirror arrangement, wherein the at least one first and second mirror arrangements are each configured to direct radiation emitted from the radiation source at an orientation selected from the group consisting of a specific angle and from a specific direction for producing the visible element onto the document,
   wherein the at least one first and second mirror arrangements are further configured to be moved into the processing area, and
   wherein each of the first and second mirror arrangements is rotatable about a respective rotation axis, and wherein the rotation axis of each mirror arrangement is adjustable in a vertical direction relative to the processing area, such that the processing area remains fixed while the mirror arrangements are selectively positioned into and out of the processing area.

2. The document processing system according to claim 1, wherein the at least one second mirror arrangement is rotated by 90 degrees relative to the at least one first mirror arrangement.

3. The document processing system of claim 1, wherein the radiation source emits laser beams in a quadrangular shaped processing area and the document also has a quadrangular shape, wherein the processing area is rotated relative to the document by a defined angle.

4. The document processing system of claim 3, wherein the defined angle is 45 degrees.

5. The document processing system according to claim 1, wherein the at least one first and second mirror arrangements are designed to be moved along a second spatial direction into the processing area.

6. The document processing system according to claim 5, wherein the first spatial direction is identical to the second spatial direction.

7. The document processing system according to claim 5, wherein the first spatial direction is different from the second spatial direction and, in particular, the first spatial direction is perpendicular to the second spatial direction.

8. The document processing system according to claim 7, wherein the first spatial direction is perpendicular to the second spatial direction.

9. The document processing system according to claim 1, wherein the heating device includes an actuator configured to effect a relative movement between a heat conducting element and the document receptacle in order to change between a first operating mode and a second operating mode of the at least one document carrier device, wherein in the first operating mode, the heat conducting element extends through one or more recesses in the document receptacle in order to be able to transfer heat generated by the heating device to the document at least in sections; and
   wherein in the second operating mode, the heat conducting element is spaced from the document at a distance that is greater compared to its location in the first operating mode.

10. The document processing system according to claim 1, wherein the document processing system includes an adjustment device configured to change the position and alignment of one or more of the at least one of the first mirror arrangement and the at least one of the second mirror arrangement in such a manner that a corresponding defined angle at which the radiation emitted by the radiation source impinges on the document is changed without changing a position of impingement of the radiation on the document.

11. The document processing system according to claim 10 wherein the adjustment device includes receptacles in the form of openings, which are configured to receive corresponding counter elements arranged on the at least one first mirror arrangement for fastening the first mirror arrangement.

12. A method for processing the document in the document processing system according to claim 1, comprising the following steps, moving the at least one document carrier device to a receiving position in which the document is placed on the document receptacle of the at least one document carrier device, moving the document carrier device along the first spatial direction into the processing area of the document processing system, moving the at least one first mirror arrangement into the processing area so that radiation emitted from the radiation source in the processing area is directed onto the document via the at least one first mirror arrangement to create the visible element, moving the at least one second mirror arrangement into the processing area so that radiation emitted from the radiation source in the processing area is directed onto the document via the at least one second mirror arrangement to create another visible element, moving the at least one document carrier device to an output position in which the document is removed from the document receptacle.

* * * * *